United States Patent [19]

Franks, deceased et al.

[11] 4,092,245
[45] May 30, 1978

[54] LIQUID PURIFICATION METHOD

[75] Inventors: Robert E. Franks, deceased, late of Los Alamitos, Calif.; by Dorothy G. Franks, administratrix, Redding, Calif.

[73] Assignee: Goetz, Trustee Sylvia, Altadena, Calif.

[21] Appl. No.: 785,698

[22] Filed: Apr. 7, 1977

Related U.S. Application Data

[63] Continuation-in-part of Ser. No. 697,543, Jun. 18, 1976, abandoned, which is a continuation of Ser. No. 553,080, Feb. 26, 1975, abandoned, which is a continuation of Ser. No. 363,943, May 25, 1973, abandoned.

[51] Int. Cl.² ............................................. C02B 3/10
[52] U.S. Cl. ...................... 210/64; 210/75; 210/169; 210/193; 210/501; 424/132
[58] Field of Search .................. 210/64, 75, 29, 169, 210/193, 252, 254, 259, 331, 335, 501; 424/125, 132

[56] References Cited

U.S. PATENT DOCUMENTS

| | | | |
|---|---|---|---|
| 2,025,570 | 5/1934 | Clark | 210/193 |
| 2,278,453 | 4/1942 | Kracklauer | 210/344 |
| 2,508,602 | 5/1950 | Goetz | 210/64 |
| 2,521,713 | 9/1950 | Goetz | 210/64 |
| 2,595,290 | 5/1952 | Quinn | 210/64 |
| 3,107,217 | 10/1963 | Muller | 210/331 |
| 3,169,920 | 2/1965 | Payne | 210/331 |
| 3,327,859 | 6/1967 | Pall | 210/501 |
| 3,477,582 | 11/1969 | Baldwin | 210/331 |
| 3,653,513 | 4/1972 | Ortega et al. | 210/169 |
| 3,788,982 | 1/1974 | Zsoldos et al. | 210/169 |

Primary Examiner—Charles N. Hart
Assistant Examiner—Peter A. Hruskoci
Attorney, Agent, or Firm—Christie, Parker & Hale

[57] ABSTRACT

A system for purifying bodies of water, such as swimming pools, includes a prefilter upstream of a catalytic filter, and a pump for periodically circulating water to be treated through the prefilter and then through the catalytic filter. The catalytic filter includes a series of horizontally disposed filter elements each having a stationary layer of a permeable water-purifying biocatalyst composition. The preferred biocatalyst is a microbicidal surface compound formed by wet processing finely divided silver oxide, zinc oxide and lampblack. Water circulated through the prefilter is filtered to remove suspended solids or algae which would clog or otherwise disturb the biocatalyst filter cake. Water circulated through the catalytic filter is purified by surface contact with the biocatalyst. Repeated pool water contact with the biocatalyst generates a residual microbicidal condition in the pool water. The biocatalyst layer, the water circulated to it, and the water circulated away from it are constantly maintained at a pH above 7 and at a temperature between about 70° F to about 98° F to prevent deactivating the biocatalyst and to constantly maintain the residual microbicidal condition.

17 Claims, 3 Drawing Figures

LIQUID PURIFICATION METHOD

CROSS-REFERENCE TO RELATED APPLICATIONS

This application is a continuation-in-part of application Ser. No. 697,543, filed June 18, 1976, now abandoned which, in turn, is a continuation of application Ser. No. 553,080, filed Feb. 26, 1975, now abandoned, which, in turn, is a continuation of application Ser. No. 363,943, filed May 25, 1973, now abandoned.

BACKGROUND OF THE INVENTION

This invention relates to a method for purifying aqueous liquids. The invention is especially applicable to treating bodies of water which can be recirculated, such as swimming pools, holding ponds of refinery waste water disposal systems, reservoirs of municipal water supply systems, and the like.

At the present time, water in swimming pools is purified by adding chlorine. Muriatic acid also is frequently added to the water to maintain its pH near 7. The use of such chemicals in the swimming water causes several problems. Chlorine and muriatic acid are extremely poisonous, and even in their diluted state are irritating to the eyes and skin of persons in the water. Halogen-containing salts also cause salt build-up and evaporative losses of chlorine and muriatic acid are costly to the pool owner.

This invention provides a method for purifying aqueous liquids which substantially eliminates the need for using poisonous and irritating chemicals for sanitation purposes. The method includes use of a permeable, aqueous liquid purifying material containing a "biocatalyst" through which the liquid to be treated is circulated. The term "biocatalyst" is used herein to mean a microbicide or microbicidal catalyst composition in the form of a finely divided substance capable of being used in a filter medium through which the liquid to be treated is passed so that contact with the microbicide will destroy microorganisms, such as algae, protozoa, bacteria, and viruses present in the liquid. Thus, there is no need to add destructive, irritating, or poisonous chemicals to the liquid being treated. The method also avoids salt build-up caused by the addition of halogen-containing salts to the liquid. Further, there is no evaporative loss of costly sanitating agents such as chlorine or muriatic acid.

Although biocatalysts have been used in the past for various sterilization or sanitation purposes, it is believed that such biocatalysts have not been used reliably and economically in a system for purifying large bodies of water by recirculating the water through the filtering system. The present invention is based on the recognition that the effectiveness of a biocatalyst for purifying water circulated through a filtering system depends upon maintaining certain operating conditions to keep the biocatalyst active. For example, the present invention is based on a recognition that a biocatalyst filter cake can be rendered inactive by excess hydrogen atoms or high temperatures. A biocatalyst also can be "blinded", i.e., coated with a thin film of organic matter which renders the biocatalyst inactive. Furthermore, if the biocatalyst is physically disturbed or eroded, it can be circulated through the filtration system and thus rendered ineffective.

The present invention provides a method for preserving the biocatalyst filter cake from such destructive conditions so that the biocatalyst will be constantly maintained in an active condition during operation of the filtration system and thereby effectively purify the water.

SUMMARY OF THE INVENTION

According to a presently preferred method of sanitizing pool water, water is circulated periodically from a pool through a filter under pump pressure to remove any suspended solids present in the pool water. The filtered pool water is then returned to the pool and filtered by contacting it with a stationary bed of a porous biocatalyst composition by repetitive circulation of the pool water through the porous bed. The biocatalyst composition consists essentially of a reaction product of a water-insoluble mixture of a finely divided basic silver compound, a finely divided basic metal oxide or hydroxide, and finely divided carbon or silica. The composition is responsive to repeated pool water contact to generate a purifying residual microbicidal condition in the pool water. The porous bed, the water circulated to it, and the water circulated away from it, i.e., the water returned to the pool as well as the pool water itself, are constantly maintained at a pH above 7 and at a temperature between about 70° F to about 98° F. The conditioned water is returned to the pool and then subsequently recontacted with the biocatalyst composition to constantly maintain the residual microbicidal condition.

In a preferred form of the invention, the biocatalyst composition consists essentially of the reaction product of an aqueous mixture of lampblack, silver oxide, and zinc oxide. The mixture is preferably digested through a pH rise to a peak value, followed by a pH reduction to a stable minimum value and then dried.

Bacteriological tests conducted on a test pool operated by the method of this invention have demonstrated that the water in the pool was about seven times more pure than ordinary tap water. No algae growth was observed for an entire ten-month period during which the test pool was observed, and during this period the pool was not vacuumed, chlorine was not used in the pool water, and the biocatalyst was not changed. The test pool demonstrated a residual microbicidal condition which continued to inactivate organisms during the entire ten-month period.

These and other aspects of the invention will be more fully understood by referring to the following detailed description and the accompanying drawing.

DRAWING

DETAILED DESCRIPTION

Figure 1:
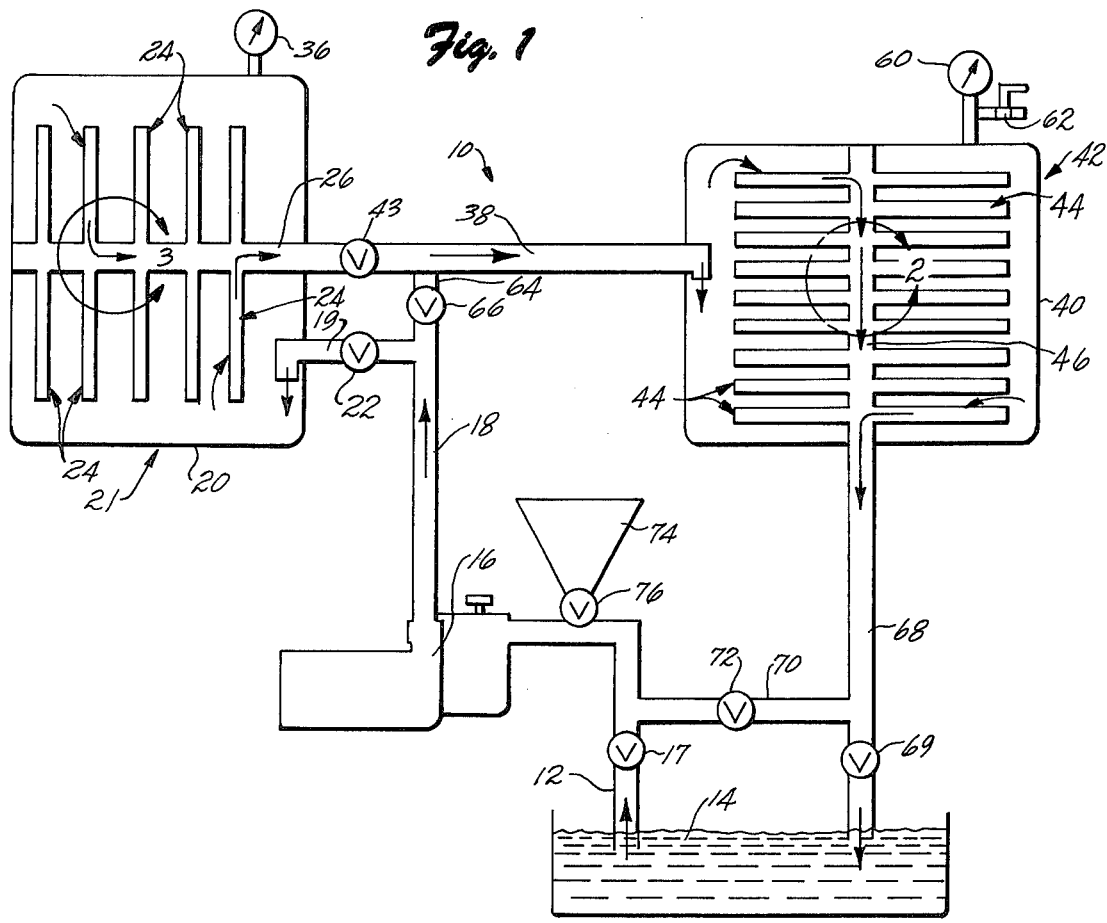
FIG. 1 is a schematic elevation view showing a liquid purification system of this invention.

A filtration and purification system 10 for aqueous liquids includes a supply conduit 12 opening into a body of water 14. The opposite end of the supply line 12 is connected to the intake side of a pump 16. A valve 17 controls the flow of water through the supply line 12. The discharge side of the pump 16 communicates with a pump outlet line 18 which, in turn, is connected to an inlet conduit 19 opening into a filtration shell 20 of a prefilter 21. A valve 22 controls the flow of water through the inlet conduit 19.

Figure 3:
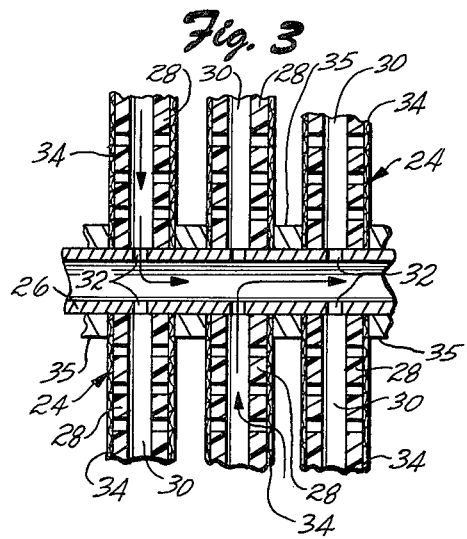
FIG. 3 is a detailed fragmentary cross-sectional elevation view showing the apparatus within the circle 3 of FIG. 1.

The filtration shell 20 includes a series of horizontally spaced apart and vertically disposed filter elements 24 mounted centrally on a horizontally disposed, elongated collection tube 26 extending centrally through the interior of the filtration shell 20. As shown best in FIG. 3, each filter element 24 preferably includes a filter plate having porous front and rear faces 28 preferably made of a hard plastic material. The two faces of each filter plate enclose an annular hollow interior area 30 which communicates with the hollow interior of the collection tube 26 via longitudinally spaced apart openings 32 in the collection tube. A filter cloth or septum 34 made of a slippery material, such as Dacron, is stretched over the outer surface of each face 28. Horizontally spaced apart spacers 35 maintain the spacing of the filter elements 24 along the length of the collection tube 26.

A pressure gauge 36 extending through the wall of the shell 20 measures the pressure of the water on the inlet side of the prefilter prior to its passing through the filter elements 24.

A transfer line 38 connected to the discharge side of the collection tube 26 extends from the prefilter to a filtration shell 40 of a catalytic filter 42. A check valve 43 in the transfer line 38 allows water to pass only from the prefilter to the catalytic filter. The filtration shell 40 includes a series of vertically spaced apart and horizontally disposed filter elements 44 mounted centrally on a vertically disposed, elongated collection tube 46 extending centrally through the filtration shell 40.

Figure 2:
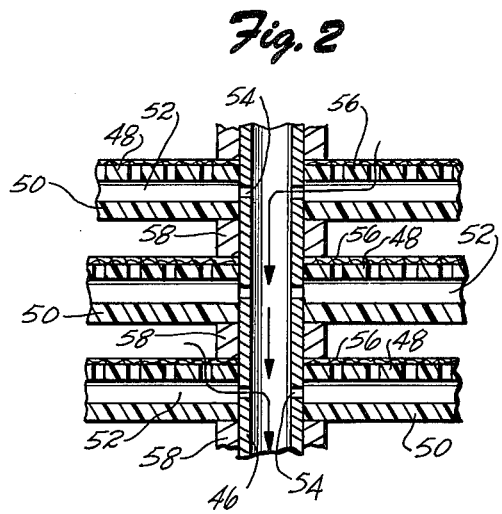
FIG. 2 is a detailed fragmentary cross-sectional elevation view showing the apparatus within the circle 2 of FIG. 1.

As shown best in FIG. 2, each filter element 44 includes a filter plate having a porous top face 48 made of a hard plastic material, and a solid bottom face 50 made of a hard plastic material. The top and bottom faces of the filter plate enclose an annular hollow interior area 52 which communicates with the hollow interior of the collection tube 46 via vertically spaced apart openings 54 in the collection tube. A septum or filter cloth 56 made of a relatively high-friction material, such as Dynel, is stretched over the top face 48 of each filter element. Vertically spaced apart spacers 58 hold the filter elements in their spaced apart relation along the length of the collection tube 46.

A pressure gauge 60 connected to the filtration shell 40 measures the pressure of the water on the inlet side of the filter elements 44. This pressure reading also is substantially that of the effluent from the prefilter 21. A bleeder valve 62 can be operated to release entrapped air in the catalytic filter.

The flow of fluid through the pump outlet line 18 may be diverted from passage through the prefilter 21 by a bypass line 64 extending from the pump outlet line 18 to the transfer line 38. A valve 66 controls the flow of water through the bypass line 64.

A discharge line 68 connected to the discharge side of the collection tube 46 recirculates filtered and purified fluid from the catalytic filter 42 through the body of water 14. A valve 69 controls the flow of water from the discharge line 68 to the body of water 14. A return line 70 extending from the discharge line 68 to the supply line 12 provides means for recirculating water through the filtration system. A valve 72 controls the flow of water through the return line 70.

A funnel-shaped hopper (often referred to as a "precoater") 74 opens into the supply line 12 through a valve 76 for use in admitting filtration material, such as filteraid, to the system.

Prior to filtering operations, the filter elements 24 of the prefilter 21 are coated with a layer of filteraid, preferably diatomaceous earth. If the filteraid is already present in the prefilter 21, when the pump 16 is started it will circulate water under pressure through the prefilter and cause the filteraid to form in a layer on each side of each filter element 24. If new filteraid is to be used, it is added to the system through the hopper 74, and the valve 22 is opened to circulate water through the prefilter 21 to form the layer of filteraid on the filter elements During filtering operations the prefilter will act as a conventional swimming pool filter to remove solid particles and organic matter, such as algae, from the water. Each time the pump is stopped, the layer of filteraid on the filter elements 24 will fall under gravity to the bottom of the prefilter. The slippery surface of each septum 34 aids in this removal of the filteraid from the filter elements. The next time the pump is started the mass of filteraid in the bottom of the prefilter will be reformed on the filter elements 24. Periodic starting and stopping of the pump will periodically reform the layer of filteraid on the filter elements 24. The solids trapped by the prefilter will be redistributed each time the layer is reformed with the result that the prefilter undergoes a self-cleaning process each time the pump is started.

The catalytic filter is placed in the line of flow immediately downstream of the prefilter. As will be described in detail below, the filter elements 44 of the catalytic filter are coated with a filter cake which includes a biocatalyst composition having microbicidal properties. The water is purified by passing it through the biocatalyst filter cake.

During filtration, the biocatalyst filter cake should remain stationary and should not be physically disturbed. If the catalytic filter cake becomes coated with solid particles, for example, the biocatalyst layer can be obstructed from surface contact with the water. If excess air is entrapped in the system, it can cause the biocatalyst layer to be eroded away. In both these instances, the water will not properly contact the biocatalyst, and will thereby avoid the microbicidal effect of the biocatalyst. The filter elements 44 preferably are in a horizontal position to help keep the biocatalyst layer in a stationary, undisturbed position during filtering operations. Moreover, the filter cloth 56 preferably is made of a material, such as Dynel, which has a fuzzy or high-friction surface to provide maximum retention of the catalytic filter cake on the filter elements 44.

The biocatalyst is a fine powder which could work its way through the surface of the supporting cloth 56 when water is circulated under pressure through the catalytic filter. If the fine powder biocatalyst passes through the diatomaceous earth layer and passes to or through the supporting cloth surface, it can get into the body of water or clog the pores of the cloth. To prevent this, a protective base coat of an inert filteraid material, preferably diatomaceous earth, is initially formed on the filter cloth 56. A layer of the biocatalyst composition is then formed on the base coat of filteraid. Since the fine powder biocatalyst would form a mud on the surface of the filteraid, and thereby create a high flow rate resistance, the biocatalyst is initially puddled in a slurry of filteraid, preferably diatomaceous earth, which causes most of the catalytic particles to cling to the diatom particles, leaving open spaces for the passage of water. The quantity of filteraid for this second step depends on the nature of the biocatalyst. A typical application is equal parts by weight of filteraid and biocatalyst. A third layer of filteraid, preferably diatomaceous earth, is then formed on top of the biocatalyst layer to protect the active surface of the biocatalyst from any matter that may not have been removed by the prefilter, or which may have entered the water between the two filters. While this "sandwich" cake is being formed on the filter elements 44, a small amount of water is circulated through it so that any escaping small biocatalyst particles will be returned to the catalytic filter and redeposited on the filter elements 44.

Preferably, the filter elements 44 are precoated by opening valves 66, and 72 and closing valves 17, 22, and 69. Each layer of material for the catalyst filter cake is added through the precoater with water and recirculated in the system for five minutes.

Once the two filters are precoated, filtering operations are begun by opening valves 17, 22 and 69, closing the valves 66 and 72, and operating the pump 16 to recirculate water under pressure through the prefilter 21, thereafter through the biocatalyst layer in the catalytic filter 42, and then back through the pool via the discharge line 68. The prefilter 21 will protect the biocatalyst layer from any deposits of matter which can disturb its static condition or otherwise interfere with its microbicidal function.

The biocatalyst is a microbicidal composition comprising an aqueous water-insoluble mixture of (1) a finely divided basic silver compound, (2) finely divided carbon or silica, and (3) a finely divided basic metal oxide or hydroxide. The basic silver compound is preferably silver oxide. The finely divided carbon or silica can be lampblack or fine silica particles having an acid surface, respectively. It is desirable that a water slurry of the silica or carbon particles have an acidic pH. The metal oxide or hydroxide is water-insoluble and has a sludge pH which is substantially basic. Examples of basic metal oxides or hydroxides are zinc oxide, titanium dioxide, alumina, aluminum hydroxide, magnesium oxide, or bismuth trioxide.

The presently preferred biocatalyst is a microbicide or microbicidal catalyst composition comprising a mixture of a water sludge of lampblack, finely divided silver oxide, and finely divided zinc oxide. A similar biocatalyst is disclosed, for example, in U.S. Pat. No. 2,508,602.

EXAMPLE 1

The preferred biocatalyst is prepared in accordance with the following method to produce a sufficient amount of biocatalyst for one charge on a 20-square foot area filter.

(1) Weigh out and mix 84 grams of dry lampblack. This should be a high-bulking channel lampblack of 90 millimicron particle diameter and slurry pH of 3.5.

(2) Weigh out and mix 11.35 grams of silver oxide and 131.66 grams of zinc oxide with the lampblack.

(3) Add 900 cc distilled water and stir the mixture of lampblack, silver oxide, and zinc oxide with the water until the mixture is of such consistency that it can be worked in a blender.

(4) Blend at the highest speed compatible with the mix. Measure the temperature and pH at 5 minute intervals. If the temperature rises to 40° C., stop the blending and allow the mixture to cool. The pH will rise to a peak as the blending continues, and will then start to fall.

(5) After the peak pH is reached, place the mix in a closed container to digest at an incubator temperature of 37° C to 38° C. A dropping pH indicates that the digestion process is taking place. Digestion should proceed until a minimum pH is reached. This will take from 8 to 24 hours.

(6) When digestion is complete, the mix will be in a liquid state. Pour the mix into two trays, exposing a maximum of surface. Dry at 38° C, while exposing to an air stream.

(7) Break up the cakes, when dry, and expose again to an air stream at 38° C. The material must be entirely dry for the final oxidating surface compound to be formed.

During filtering operations, pool water is repetitively circulated through the porous biocatalyst layer. Repeated contact with the biocatalyst produces a residual purifying condition in the effluent from the biocatalyst. The effluent so treated and returned to the pool contains purifying agents which constantly maintain the residual purifying condition in the pool. As described in greater detail below, bacteriological tests show that the treated pool water will inactivate organisms immediately, and even when the same sample of pool water is re-inoculated at a later time with an even greater number of organisms, the residual purifying action in the treated pool water continues to inactivate the organisms.

During filtering operations, there are several steps to follow to maintain the microbicidal activity of the biocatalyst. Such steps include pressure control, temperature control, pH control and air flow control.

PRESSURE CONTROL

The pressure gauge 36 indicates when the prefilter cake should be changed, and the pressure gauge 60 indicates when the biocatalyst filter cake should be recharged. Once the biocatalyst filter cake has been freshly reformed, and the prefilter has been freshly coated with diatomaceous eath, the readings of the pressure gauges 36 and 60 are the guidelines for indicating when the filters should be changed again. The pressure readings will vary depending upon the size of the piping and the type of the pump, for example. An increase in differential pressure between the two filters will indicate that the filter cake in the prefilter should be changed. Thus, assuming that the initial influent pressure in the prefilter (measured by gauge 36) is 15 psi, and the initial effluent pressure from the prefilter to the catalytic filter (measured by gauge 60) is 13 psi, removal of matter by the prefilter will cause the influent pressure to rise to about 18 psi and the effluent pressure to fall to about 10 psi. At this time, the filteraid in the prefilter should be changed.

As the catalytic filter slowly becomes coated, the pressure will increase in both filters, but the differential pressure between the two will decrease slightly. When the effluent pressure measured by the pressure gauge 60 gets fairly close to the influent pressure, or when the effluent pressure rises to a certain amount (from 10 to 13 psi in the above example), it is time to recharge the biocatalyst filter cake.

The biocatalyst filter cake preferably is regenerated by adding hydrogen peroxide to the water upstream of the catalytic filter. In a swimming pool under conditions of summer use, 8 ounces of 20 volume peroxide (hair bleach concentration) every two weeks is sufficient to maintain peak performance. If all the necessary conditions are fulfilled, it is possible to have perfectly clean and sanitary water, without changing either filter cake, for four months, and without the addition of chlorine.

pH Control

The microbicidal activity of the biocatalyst depends upon an oxidation reaction, so any excess of hydrogen ions will denature it or inhibit its action. The pH of the water to be treated must be at 7 or above. In the special case of swimming pools, too high a pH leads to liming of the heater and a deposit on the walls requiring acid washing. A good compromise pH for swimming pool maintenance is between 7.4 and 7.6.

TEMPERATURE CONTROL

The biocatalyst filter cake, the water coming into it, and the effluent from it, and the pool water itself should not be exposed to temperatures below about 70° or above about 98° F. The biocatalyst layer and/or its residual purifying agents will be temporarily or permanently inactivated at temperatures outside the 70° to 98° F range. If a water heater is used in the pool circulating system, a preferred arrangement is for the heater to be so located that the effluent from the heater will not immediately mingle either with the effluent from the catalytic filter, or with the water circulated into the catalytic filter. In the preferred arrangement, the water heater is located upstream from the catalytic filter. In a pool already having a heater connected with the filter flow, a bypass and heat trap should be used to ensure that the water circulated away from the heater is not heated above about 98° F. Alternatively, the heater could have its own pumping system, and water from the heater could be circulated back to the pool prior to the pool water thereafter being circulated through the biocatalyst filter. In any system having a heater, the heater should be operated at a relatively low temperature setting. Good results are obtained when the pool heater is operated on a substantially continuous basis under conditions which do not heat the water to temperatures above about 98° F. In the test pool described below, the water coming from the heater was about 85° F. In this way, the residual purifying action of the effluent from the catalytic filter is not exposed to potentially high temperatures which could otherwise inactivate the purifying agents in the effluent. Moreover, operating the heater constantly at the relatively low temperature setting of 85° F ensures that the temperature of the pool water will be constantly maintained above about 70° F.

It is believed that the residual effect produced by the biocatalyst comprises autovaccines, or inhibiting agents, in the effluent from the biocatalyst which are produced by, or consist of, nascent oxygen which, in turn, is emitted by the biocatalyst. It is believed that such autovaccines are generated by organisms being converted into antibodies or vaccines for themselves when they are contacted with the nascent oxygen produced by the biocatalyst. As demonstrated in the test pool results described below, once the residual microbicidal effect is present in the water, the more organisms that are put into the water, the faster they are inactivated.

It is also believed that at relatively low temperatures within the 70° F to 98° F range, molecular oxygen is taken in and relatively lower amounts of nascent oxygen are emitted by the biocatalyst. At relatively higher temperatures within this range, a much larger amount of nascent oxygen is emitted and relatively little molecular oxygen is bound. In the test pool described below, in which the heater is located upstream from the biocatalyst filter, when warmer water no higher than 98° F flows through the biocatalyst, nascent oxygen emission is near maximum. When the heater is turned off for relatively short periods of time, the flow of water to the biocatalyst is relatively closer to 80° F. At this lower temperature, more molecular oxygen is taken in and little nascent oxygen is produced, which regenerates the biocatalyst. On the other hand, if the heater is located downstream from the catalytic filter, then pool water at a relatively steady temperature flows through the biocatalyst. If the steady temperature is relatively high, the biocatalyst will emit mostly nascent oxygen for a period of time until, without regeneration, the biocatalyst will break down. If the steady temperature of the water to the biocatalyst is relatively low, it will absorb molecular oxygen and emit only very small amounts of nascent oxygen, which is not sufficient to maintain an effective residual microbicidal condition over a prolonged period of time.

PREVENTION OF AIR FLOW THROUGH CATALYTIC FILTER

If air is able to flow through the catalytic filter, it will bubble through the catalytic sandwich cake and disturb its formation, which will shorten the effective life of the filter cake. Air can enter the system through the suction valve 17 if its packing gland is not tight. A self-priming pump also will draw air into the system. In the case of swimming pools, an operator of the vacuum pump might draw air in by having the intake open to the air while the pump is running. The bleeder valve 62 can be used to remove air entrapped in the system when the prefilter and catalytic filter are being initially charged, or when air accidentally enters the system.

EXAMPLE 2

The biocatalyst composition described above was used experimentally in about twenty swimming pools to test the bacteriological effect of the biocatalyst. These pools were tested in conventional swimming pool circulation and filtration systems in which pool water is repetitively circulated away from the pool, through a filter, and back to the pool. Each pool had a separate filter having a stationary bed of a porous biocatalyst similar to that described above. That is, each biocatalyst comprised a reaction product of a mixture of lampblack, silver oxide, and zinc oxide. The pool water was repetitively circulated through the biocatalyst. The pool water in each pool also was prefiltered prior to contact with the biocatalyst to remove suspended solids, organic matter, and the like from the water prior to circulating it through the biocatalyst. Although all pools tested had the same basic system for circulating water through the biocatalyst, only the pool operated by the inventor named in this application was able to maintain a long-term water-purifying condition in the pool water which did not require the addition of any chlorine or frequent changing of the biocatalyst. This pool will be referred to herein as the "test pool".

The test pool was operated in an unconventional manner in that the swimming pool heater was installed upstream from the filter housing which contained the biocatalyst. The heater had a heat trap to prevent heat buildup in the heat exchangers from heating water circulated to the catalytic filter above about 98° F. The test pool also was operated in an unconventional manner in that the pool heater was run for relatively long continuous periods of time and the water in the heater itself was never heated to more than about 98° F, as opposed to the more conventional practice of running the pool heater for shorter periods at much higher temperatures. Typically, swimming pool heaters heat the water circulated through them to temperatures above at least 160° F. In the test pool the temperature of the water passing through the biocatalyst layer, together with the temperature of the biocatalyst itself, the effluent from the biocatalyst, and the water in the pool all were maintained below 98° F. The test pool was observed for a 10-month period, and during this test period, the average temperature of the pool water was about 85° F. The pool water was constantly maintained in the range of 70° F to 98° F. The test pool water also was constantly maintained at a pH well above 7. The customary chlorine salt products were not added to the pool water for the 10-month period during which the pool was observed, and therefore it was not necessary to add acid to the pool water, except in small amounts of infrequent intervals in order to prevent scale buildup in the heater.

After successful operation of the test pool, and unsuccessful operation of the other pools tested, it was discovered that the microbicidal effect of the biocatalyst is destroyed if the biocatalyst filter is installed ahead of the heater, and the heater is operated under ordinary high temperature conditions, typically above 160° F. In this instance the active effluent will be overheated, and its residual microbicidal effect destroyed. It was also discovered that the microbicidal effect of the biocatalyst is destroyed if the biocatalyst filter is installed after a heater which is operated at conventional high temperatures. In this instance, the hot water will, in effect, denature the catalyst permanently. In the pools tested which were operated under these conditions, no pool had the long continued residual microbidical condition produced in the pool water comparable to that which was successively produced in the test pool.

It was further discovered that pools which were not heated also were not able to obtain the residual microbicidal condition produced in the test pool water. It was discovered that in unheated pools where the pool water termperature went below about 70° F, the residual microbicidal effect of the biocatalyst was destroyed, and the pool goes to algae.

Moreover, in many of the pools the pool owner added acid to the water to control the pH of the water. This lowered the pH of the pool water to below 7 immediately after acid addition. It was discovered that this lower pH, even for a short period of time, destroyed the residual microbicidal effect produced by the biocatalyst, as well as the ability of the biocatalyst to produce such an effect.

The pools tested, other than the test pool, also required frequent changing of the biocatalyst.

The test pool ran algae-free for more than ten months on one biocatalyst filter cake, which was not changed, and without the addition of any chlorine.

During the 10-month period the test pool was observed, the pool water was tested for its bacteriological activity by taking a gallon of pool water and inoculating it with *E. coli* organisms to identify the effect the pool water would have on the bacteria. For a control, a gallon of boiled tap water was similarly inoculated. The bacteriological tests consisted of filtering the water through a membrane which holds the bacteria on its surface, and then placing the membrane immediately on a nutrient pad and incubating, and finally measuring the colonies of bacteria produced. The first test produced the following results:

|  | ORGANISMS/ml | |
| --- | --- | --- |
|  | Test Pool | Boiled Tap Water Control |
| Immediate Count | 65 | 55 |
| After 30 Minutes | 3 | 41 |
| After 90 Minutes | 1 | 53 |

The same water was re-inoculated 24 hours later with larger number of organisms, with the following results:

|  | ORGANISMS/ml | |
| --- | --- | --- |
|  | Test Pool | Boiled Tap Water Control |
| Immediate Count | 188 | 196 |
| After 30 Minutes | 93 | 190 |
| After 90 Minutes | 10 | 195 |

Thus, the pool water from the test pool had a strong residual anti-bacterial condition even against a high inoculum 24 hours after removal from the pool.

In a separate test conducted prior to the tests described above, a small volume of water was taken from the test pool and immediately tested for its bacteriological effect according to the test procedures described above. This pool water sample was compared with the tap water which was being periodically added to the test pool and found to be about seven times as pure as the tap water.

What is claimed is:

1. In a method of sanitizing pool water which includes circulating the water periodically from a pool through a filter under pump pressure to remove any suspended solids present in the pool water, and returning the filtered pool water to the pool, the steps of:

contacting said filtered pool water with a stationary bed of porous biocatalyst composition by repetitive circulation of the pool water through the porous bed;

the porous bed having a protective first layer of filter-aid material on the surface of a filter element, the layer of biocatalyst composition being formed on the first layer of filteraid, with a protective second layer of filteraid being formed on the biocatalyst layer;

said biocatalyst composition consisting essentially of a reaction product of a finely divided, water-insoluble mixture of a basic silver compound, carbon or silica particles, and a basic metal oxide or hydroxide, the finely divided basic metal oxide or hydroxide being selected from the group consisting of zinc oxide, alumina, aluminum hydroxide, bismuth trioxide, magnesium oxide, and titanium oxide;

said biocatalyst composition being responsive to repeated pool water contact to generate a purifying residual microbicial condition in the pool water;

maintaining the pool water, the porous bed, the pool water circulated to the porous bed, and the water circulated away from the porous bed to the pool at a pH above 7 and at a temperature between about 70° F and about 98° F;

returning the conditioned water to the pool; and recontacting the conditioned water with said biocatalyst composition to maintain said residual microbicidal condition.

2. The method according to claim 1 in which the biocatalyst composition consists essentially of the product of an aqueous mixture of lampblack, silver oxide, and zinc oxide.

3. The method according to claim 2 in which said mixture is digested through a pH rise to a peak value, followed by a pH reduction to a stable minimum value, and then dried.

4. The method according to claim 1 including forming the fixed biocatalyst layer on only the top surface of a porous, horizontally disposed filter element; repetitively contacting the pool water with the biocatalyst by forcing it through the porous biocatalyst layer and the filter element; and then returning the effluent to the pool.

5. The method according to claim 4 including forming the fixed biocatalyst layer on a filter element having a top surface with means for frictionally holding the biocatalyst layer in an undisturbed condition on the filter element.

6. The method according to claim 1 including forming the fixed biocatalyst layer on only the top surface of a porous, horizontally disposed filter element; repetitively contacting the pool water with the biocatalyst by forcing it through the porous biocatalyst layer and the filter element; and then returning the effluent to the pool.

7. The method according to claim 6 in which the biocatalyst composition consists essentially of the product of an aqueous mixture of lampblack, silver oxide, and zinc oxide.

8. The method according to claim 7 in which said mixture is digested through a pH rise to a peak value, followed by a pH reduction to a stable minimum value and then dried.

9. The method according to claim 1 in which the basic silver compound comprises silver oxide.

10. The method according to claim 1 in which the finely divided carbon or silica has an acidic pH.

11. The method according to claim 10 in which the carbon comprises lampblack.

12. The method according to claim 1 including passing the pool water through a heater to maintain the effluent pool water from the heater in said temperature range of about 70° F to about 98° F; and thereafter passing the effluent from the heater to the biocatalyst layer.

13. The method according to claim 12 including regenerating the biocatalyst by alternately raising and lowering the temperature of the water flow to the biocatalyst.

14. The method according to claim 12 including circulating the effluent from the heater back to the pool prior to drawing water from the pool through the biocatalyst layer.

15. The method according to claim 12 in which the heater has a heat trap to constantly maintain the effluent passed to said biocatalyst layer in said temperature range of about 70° F to about 98° F.

16. The method according to claim 1 including regenerating the biocatalyst by alternately raising and lowering the temperature of the water flow to the biocatalyst.

17. The method according to claim 16 in which the biocatalyst composition consists essentially of the product of an aqueous mixture of lampblack, silver oxide and zinc oxide.

* * * * *